United States Patent [19]

Cooper

[11] Patent Number: 5,110,684
[45] Date of Patent: May 5, 1992

[54] MASONRY WATER REPELLENT

[75] Inventor: Ian V. Cooper, Georgetown, Canada

[73] Assignee: Dow Corning Corporation, Midland, Mich.

[21] Appl. No.: 609,861

[22] Filed: Nov. 7, 1990

[51] Int. Cl.$^5$ .......................... B32B 13/00; B32B 9/04
[52] U.S. Cl. .................... 428/447; 427/209; 427/387; 427/393.6; 428/703
[58] Field of Search ..................... 427/209, 387, 393.6; 428/447, 703

[56] References Cited

U.S. PATENT DOCUMENTS

| | | |
|---|---|---|
| 4,204,030 | 5/1980 | Takamizawa et al. ............. 428/703 |
| 4,258,102 | 3/1981 | Traver et al. ...................... 428/703 |
| 5,066,520 | 11/1991 | Freiberg et al. .................... 428/703 |

*Primary Examiner*—William J. Van Balen
*Attorney, Agent, or Firm*—Jim L. DeCesare

[57] ABSTRACT

A method of rendering masonry architectural building materials water repellent by incorporating into the masonry architectural building material an additive which is a mixture of (i) a water soluble silane coupling agent and (ii) an emulsion which includes water, at least one surfactant, and a siloxane fluid. The siloxane fluid is one of a linear methylhydrogen siloxane polymers, linear methylhydrogen-methylalkyl siloxane copolymers, methylhydrogen cyclosiloxane polymers, or methylhydrogen-methylalkyl cyclosiloxane copolymers. An inorganic porous mineral substrate including the mixture is also disclosed.

41 Claims, No Drawings

MASONRY WATER REPELLENT

BACKGROUND OF THE INVENTION

This invention relates to organosilicon masonry water repellent compositions, and more particularly is directed to a water repellent composition for treating porous substrates which includes a mixture of a water soluble silane coupling agent and a siloxane fluid in the form of an emulsion containing a linear or cyclic methylhydrogen polymer, or a copolymer such as a linear methylhydrogen-methylalkyl siloxane or methylhydrogen-methylalkyl cyclosiloxane.

Water resistance is an important factor in masonry construction. This is for the reason that moisture movement in masonry causes or contributes to problems such as expansion, shrinkage, cracking, staining, mildew, lowered resistance to freezing and thawing, chemical attack, corrosion of reinforcing steel, and damage to structures from settling. Because of these problems, various techniques have been used to render masonry water resistant. Some of these methods include the surface treatment of structures with water repellents. Water repellents that have been used in the past are oils, waxes, soaps, and resins, and they have been applied to the masonry surfaces by brush, roller, air spray, or airless spray techniques. One of the most prevalent category of repellent that has been used is organosilicon compounds, and such compounds in organic solvents have been found to be useful for brick, concrete, stucco, or terrazo surfaces.

It is not new in the patent art to employ organosilicon compounds for the treatment of masonry surfaces in order to render such surfaces water repellent. For example, in U.S. Pat. No. 3,772,065, issued Nov. 13, 1973, there is disclosed an impregnant which is an alcohol or hydrocarbon solution of alkyltrialkoxysilanes or oligomers thereof. In U.S. Pat. No. 3,849,357, issued Nov. 19, 1974, a composition is described which is a mixture of a water base paint, and the reaction product of an alkyltrialkoxysilane, an alkyl orthosilicate, and water. U.S. Pat. Nos. 3,389,206, issued Apr. 22, 1975, and 4,002,800, issued Jan. 11, 1977, disclose a solution containing an alcohol or hydrocarbon solvent, an alkyltrialkoxysilane, and an additive. The additive is either an organofunctional silane such as aminopropyltriethoxysilane or an alcoholate such as butyl titanate. U.S. Pat. No. 3,914,476, issued Oct. 21, 1975, refers to an aqueous solution containing an alkali metal organosiliconate, and an aqueous soluble carbonate or bicarbonate. In U.S. Pat. No. 3,955,985, issued May 11, 1976, an aqueous solution is described containing an alkali metal organosiliconate, a miscible alcohol or ketone, and an organic complexing or chelating agent such as nitrilotriacetic acid.

U.S. Pat. No. 3,956,570, issued May 11, 1976, applies an aqueous solution of an alkali metal propylsiliconate. Surfaces are contacted with water followed by treatment with a mixture of calcium hydroxide and butyltrimethoxysilane in ethyl alcohol in U.S. Pat. No. 4,073,972, issued Feb. 14, 1978. In U.S. Pat. No. 4,076,868, issued Feb. 28, 1978, there is applied a solvent solution thickened with a filler, and containing either (i) a polysiloxane having a viscosity less than 1000 cs, (ii) an alkyltrialkoxysilane, or (iii) an alkali metal hydrocarbon siliconate. U.S. Pat. No. 4,102,703, issued Jul. 25, 1978, forms a stable suspension of hydrophobed metal oxides in ethylene glycol and applies the suspension to masonry. Hydrophobing is accomplished with either (i) organohalosilanes, (ii) organosilylamines, (iii) cyclic organosilazanes, (iv) organocyclosiloxanes, (v) polyorganosiloxanes, (vi) alkylhydrogen silicone oils, or (vii) hydroxyendblocked polyorganosiloxanes.

In U.S. Pat. No. 4,209,432, issued Jun. 24, 1980, the patentee applies a solvent solution containing a filler such as fume silica, and containing either (i) an organosiloxane having more than ten silicon atoms per molecule, (ii) an alkyltrialkoxysilane, (iii) the reaction product of a silane and ethylene glycol, or (iv) an alkali metal hydrocarbon siliconate. U.S. Pat. No. 4,273,813, issued Jun. 16, 1981, employs a coating of an emulsion of an anionically stabilized hydroxyendblocked polydiorganosiloxane, amorphous silica, and an organic tin salt. In U.S. Pat. No. 4,342,796, issued Aug. 3, 1982, the patentee dries the surface to be treated, applies an alkyltrialkoxysilane to the dried surface, allows the silane to migrate into the surface, and applies water to the treated surface. U.S. Pat. No. 4,352,894, issued Oct. 5, 1982, applies an aqueous solution of an alkylsilanol prepared from propyltrimethoxysilane. A coating of a moisture curable urethane resin and an alkylpolysiloxane or hydroxyalkyl polysiloxane such as 2-ethylhexyl polysiloxane, stearyl polysiloxane, or hydroxyethyl polysiloxane, is disclosed in U.S. Pat. No. 4,413,102, issued Nov. 1, 1982. In U.S. Pat. No. 4,433,013, issued Feb. 21, 1984, there is applied an emulsion of an akyltrialkoxysilane including a deactivatable surfactant such as a fatty acid ester or silica ester. After the emulsion is applied, the surfactant is deactivated with water containing an alkaline or acid substance. U.S. Pat. No. 4,478,911, issued Oct. 23, 1984, relates to a coating which includes an alkyltrialkoxysilane, water, an organic solvent, and a catalyst such as an organic amine. In U.S. Pat. No. 4,486,476, issued Dec. 4, 1984, the patentee impregnates with a water immiscible solvent such as naphtha containing a mixture of a methylethoxysiloxane having an ethoxy content of 12 percent and a methylethoxysiloxane having an ethoxy content of 43 percent.

U.S. Pat. No. 4,631,207, issued Dec. 23, 1986, employs a solvent such as a glycol ether containing the reaction product of octamethylcyclotetrasiloxane and N-(2-aminoethyl)-3-aminopropyl dimethoxymethylsilane. Reexamined U.S. Pat. No. B1 4,648,904, issued Mar. 10, 1987, is directed to an emulsion of an alkyltrialkoxysilane, an emulsifier having an HLB value of 2-20, and water. A solution containing an alkylalkoxy polysiloxane resin is applied to masonry in U.S. Pat. No. 4,717,599, issued Jan. 5, 1988, An oily composition or emulsion is disclosed in U.S. Pat. No. 4,741,773, issued May 3, 1988, containing a mixture of a silicone oil with either a nonvolatile paraffinic oil such as turbine oil or a nonvolatile low molecular weight hydrocarbon resin such as polybutene. In U.S. Pat. No. 4,753,977, issued June 28, 1988, the treating composition includes an organopolysiloxane resin, an alkylalkoxy polysiloxane resin, and a condensation catalyst. A sealer including a hydroxysubstituted polyorganosiloxane and a mixture containing (i) an aromatic solvent such as toluene, (ii) a chlorinated solvent such as trichloroethane, and (iii) an aliphatic solvent such as heptane, is taught in U.S. Pat. No. 4,786,531, issued Nov. 22, 1981.

In U.S. Pat. No. 4,846,886, issued Jul. 11, 1989, and in U.S. Pat. No. 4,874,431, issued Oct. 17, 1989, the patentees apply a combination of (i) a carrier such as an alcohol, glycol ether, or mineral spirits, (ii) a metal salt catalyst, (iii) an alkylalkoxysilane, and (iv) a beading agent such as a fluorosilicone fluid, a polydimethylsiloxane fluid, a room temperature curable silicone rubber, an amine salt functional siloxane copolymer, or trimethylsilyl endcapped polysilicate. A buffered aqueous silane emulsion is disclosed in U.S. Pat. No. 4,877,654, issued Oct. 31, 1989, and U.S. Pat. No. 4,889,747, issued Dec. 26, 1989, containing a hydrolyzable silane, an emulsifier with an HLB value of 1.5-20, water, and a buffering agent.

One category of organosilicon compound which has been used extensively is the alkoxysilane, and representative of such masonry treatments with alkoxysilanes can be found in U.S. Pat. No. 3,772,065, issued Nov. 13, 1973; U.S. Pat. No. 3,879,206, issued Apr. 22, 1975; U.S. Pat. No. 4,478,911, issued Oct. 23, 1984; U.S. Pat. No. 4,648,904, issued Mar. 10, 1987; U.S. Pat. No. 4,846,886, issued Jul. 11, 1989; and U.S. Pat. No. 4,874,431, issued Oct. 17, 1989. Another category of organosilicon compound frequently used in masonry treatment is the siloxane. Representative of such masonry treatments with siloxanes can be found in U.S. Pat. No. 4,209,432, issued Jun. 24, 1980; U.S. Pat. No. 4,342,796, issued Aug. 3, 1982; and U.S. Pat. No. 4,753,977, issued Jun. 28, 1988. The compositions of the present invention differ from the compositions of the prior art in that they include a mixture of a water soluble silane coupling agent and an emulsion containing a siloxane fluid. The fluid has in the siloxane molecule the silylidyne radical

This is significant as will be pointed out hereinafter.

Of particular relevance to the present invention are U.S. Pat. Nos. 3,879,206, and 4,002,800, noted above, each of which teach an alkyltrialkoxysilane such as butyltrimethoxysilane in combination with an additive such as aminoethylaminopropyltriethoxysilane. However, the combination is applied in a solvent such as ethanol rather than in the form of an aqueous solution as in the present invention. While U.S. Pat. No. 4,478,911, also noted above, includes an alkyltrialkoxysilane combined with an amine, the amine is an organic amine rather than an aminofunctional silane as in the present invention. Both U.S. Pat. Nos. 4,846,886, and 4,874,431, noted previously, teach an alkylalkoxysilane and a beading agent which can be a material such as an aminofunctional silane of the formula $H_2HCH_2CH_2NH(CH_2)_3SI(OMe)_3$, however, the combination is applied in a carrier other than water such as an alcohol, glycol ether, or mineral spirits, and no aqueous solution is formed as in the present invention. Thus, there are significant differences between what it taught in accordance with the concept of the present invention and what is disclosed in the prior art as evidenced by the several patents noted and discussed above.

SUMMARY OF THE INVENTION

This invention is directed to a method of rendering masonry architectural building materials water repellent by incorporating into the masonry architectural building material an additive which is a mixture of (i) a water soluble silane coupling agent and (ii) an emulsion which includes water, at least one surfactant, and a siloxane fluid. The siloxane fluid is selected from the group consisting of linear methylhydrogen siloxane polymers, linear methylhydrogen-methylalkyl siloxane copolymers, methylhydrogen cyclosiloxane polymers, and methylhydrogen-methylalkyl cyclosiloxane copolymers.

The invention is also directed to a water repellent masonry architectural building material which is an inorganic porous mineral substrate having the above noted additive incorporated therein.

It is therefore an object of the present invention to chemically fix a water-repelling agent to a porous substrate in order to improve its resistance to the absorption of water as well as to impart to the substrate the ability to shed surface water.

It is a further object of the present invention to increase the density of an organosilicon matrix within a porous substrate in order to render the substrate water resistant, and at the same time provide it with the property of shedding water.

It is also an object of the present invention to provide a masonary water repellent composition for porous substrates in which the repellent not only renders the substrate resistant to water penetration but in addition hinders the ingress of water at the surface.

These and other objects, features, and advantages of the herein described invention will become more apparent from a consideration of the following detailed description thereof.

DETAILED DESCRIPTION OF THE INVENTION

Masonry water repellents including alkylalkoxysilanes impart water repellent properties to such porous substrates as concrete, mortar, and stone. Such repellents function in this fashion because of the fact that they penetrate into the masonry prior to the time that they are transformed into immobile resinous materials. However, due to the penetration of the repellent into the porous substrate, the repellent does not leave behind much of a layer on the porous substrate. As a result, the repellent, though effective to render the substrate water resistant fails nevertheless to provide the substrate with coatings of any significant durability. The compositions disclosed herein are intended to overcome this deficiency and there can be achieved a good degree of water shedding function of the masonry structure because of polymer deposition on the masonry, in addition to the repellent formulation providing a deep section water barrier to water migration within the substrate itself.

A major advantage of the repellent compositions of the present invention is that the compositions are capable of being formulated into a form which complies with various state and federal regulations regarding volatile organic content (VOC). These regulations generally prohibit a volatile organic content for an architectural coating which is in excess of about four hundred grams per liter. In the case of the compositions of the present invention, no volatile component is liberated from the reaction of the penetrant with concrete. Prior art solvent based alkoxysilanes on the other hand, liberate alcohol which is a volatile organic compound.

Accordingly, a penetrant can be formulated with the compositions of the present invention which complies with the volatile organic content regulations. Thus, a penetrant in accordance with the present invention will have a volatile organic content generally less than about four hundred grams per liter. In contrast, equivalent penetrants of the prior art which contain alkoxysilanes such as isobutyltrimethoxysilane have volatile organic contents of the order of magnitude of about 650-700 grams per liter.

The water repellent composition for treating porous substrates in accordance with the present invention includes as one of the components of a mixture an emulsion containing water, at least one surfactant, and a siloxane fluid which is either a linear methylhydrogen siloxane, a methylhydrogen-methylalkyl siloxane copolymer, a methylhydrogen cyclosiloxane, or a methylhydrogen-methylalkyl cyclosiloxane copolymer. The siloxane has the formula selected from the group consisting of

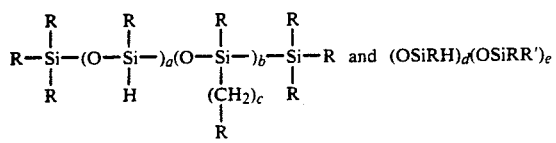

where R is an alkyl radical having one to three carbon atoms; R' is the alkyl radical $(CH_2)_cR$; a is an integer having a value of from 3 to 35; b is an integer having a value of from zero to 32; c is an integer having a value of from one to seventeen; d is an integer having a value of from 3 to 10; and e is an integer having a value of from zero to seven.

The emulsion can include from about twenty to about sixty percent by weight of the siloxane, and preferably the emulsion includes forty to fifty percent by weight of the siloxane. Preferably, the integer a has a value of three or four; the integer b has a value of two or three; the integer c has a value of five, six, or seven; the integer d has a value of three or four; and the integer e has a value of one or two.

The following examples are set forth for the purpose of illustrating the basic concepts of the present invention including the method of preparing the siloxane fluids of the present invention, as well as test data indicating the utility of masonry treatments with such compositions.

EXAMPLE I

Into a 250 ml round bottom flask equipped with a reflux condenser and a heating mantle was placed a solution of 48 grams of $(OSiMeH)_4$ and 16.8 grams of 1-hexene. One piece of eight mesh 0.5% Pt/C of 40 mg total weight, or about 0.2 mg Pt was added to the solution and the contents of the flask were heated to reflux. An exotherm occurred during heating for about 10 minutes. The mixture was heated at reflux for an additional 15 minutes after which it was allowed to cool to room temperature. Fourier Transform Infrared Analysis of an alliquot of the mixture revealed the presence of SiH and the absence of olefin. Gas chromatography/mass spectrometry analysis revealed the product to be a mixture having the following composition:

| | |
|---|---|
| $(OSiMeH)_4$ | 15% |
| $(OSiMeH)_3/(OSiMeC_6H_{13})$ | 50% |
| $(OSiMeH)_2/(OSiMeC_6H_{13})_2$ | 25% |
| $(OSiMeH)/(OSiMeC_6H_{13})_3$ | 10% |

EXAMPLE II

Following the same procedure of Example I, a mixture of 75 grams of $Me_3Si-(OSiMe_2)_3(OSiMeH)_5-OSiMe_3$ and 18.4 grams of 1-hexene was allowed to react in the presence of 0.2 mg Pt as 0.5% Pt/C.

EXAMPLE III

A solution of 333 grams of $(OSiMeH)_4$ and 210 grams of 1-dodecene $(C_{12}H_{24})$ was prepared by weighing the two compounds into a one liter bottle and stirring the contents for one minute. 100 grams of this solution was placed into a one liter round bottom flask equipped with a reflux condenser and a heating mantle. Two pieces of eight mesh 0.5% Pt on C (0.2 mg Pt each) were added to the flask and the mixture was heated to boiling. The remainder of the solution was poured into a 500 ml dropping funnel which was placed near the top opening of the reflux condenser. When the mixture in the flask started to boil, solution from the dropping funnel was added slowly through the reflux condenser. The fresh solution was added to the mixture at such a rate so as to maintain a gentle reflux in the flask. Addition of the solution in the dropping funnel required about 45 minutes. After all of the solution had been added, the mixture in the flask was heated at reflux for an additional 15 minutes. The mixture was allowed to cool to room temperature and filtered through diatomaceous earth.

The reaction scheme for the process of preparing and using the composition of Example I can be seen as follows:

$$(OSiMeH)_4 + C_6H_{12} \xrightarrow{Pt/C} (OSiMeH)_3(OSiMeC_6H_{13})$$

Thus, methylhydrogen cyclosiloxane is reacted with the olefin 1-hexene in the presence of a platinum-carbon catalyst to produce a low molecular weight siloxane penetrant having alkylmethylsiloxy and organohydrosiloxy groups. When applied to masonry, the low molecular weight siloxane having alkylmethylsiloxy and organohydrosiloxy groups of the formula $(OSiMeH)_{0.75}(OSiMeC_6H_{13})_{0.25}$ is converted by hydrolysis and subsequent condensation to a copolymeric silicone resin of the formula $(MeSiO_{3/2})_{0.75}(OSiMeC_6H_{13})_{0.25}$. This resin is present on the surface and in the pores of the masonry, and renders it resistant to water.

This hydrosilylation reaction of the olefin with a low molecular weight methylhydrogen siloxane does not usually produce a pure compound but a mixture of compounds is produced, and this mixture is used as one of the waterproofing agents. It is not necessary to use pure compounds since upon application to masonry the penetrant hydrolyzes and condenses to form a silicone resin.

As previously noted, the compositions of the prior present invention differ from the compositions of the prior art in the presence in the siloxane molecule of the silylidyne radical

This difference is significant since the silylidyne radical of the masonry repellent of the present invention reacts with the hydroxide groups and moisture in the masonry substrate to form the copolymeric silicone resin described above. This resin is formed within the pores of the masonry substrate to which the repellent composition is applied. The copolymeric silicone resin that is formed within the masonry substrate pores is hydrophobic and therefore readily resists the permeation of water onto and into the porous surface and interior of the masonry material. The compositions of the present invention have a relatively low viscosity and therefore are capable of diffusing into porous masonry substrates. When applied to a masonry substrate, the latent alkalinity of the masonry catalyzes the reactions of water and hydroxide groups with the silylidyne radical to produce SiOH and hydrogen. The alkaline masonry further catalyzes the condensation of SiOH groups to produce siloxane bonds and water, and a resinous structure is ultimately produced.

As noted above, the repellent compositions of the present invention are capable of being formulated into coatings which comply with various state and federal regulations regarding volatile organic content (VOC). These regulations prohibit a volatile organic content architectural coating in excess of four hundred grams per liter. In the present invention, the volatile component liberated from the reaction of the repellent with masonry is hydrogen which is not a volatile organic compound. Prior art alkoxysilanes on the other hand liberate alcohol which is a volatile organic compound.

Accordingly, a masonry repellent can be formulated with the compositions of the present invention which complies with the volatile organic content regulations. Thus, a repellent in accordance with the present invention containing about forty-five to about fifty percent by weight solids will have a volatile organic content less than about four hundred grams per liter. Penetrants of the prior art which contain alkoxysilanes such as isobutyltrimethoxysilane have volatile organic contents about 650-700 grams per liter.

Although the alkyl group of the siloxanes described in the present invention contribute to the ability of the compound to render masonry hydrophobic, its presence is not always required. Thus, methylhydrogen siloxane may be used to waterproof masonry, and the resulting silicone resin formed after complete hydrolysis and condensation is monomethylsilsequioxane or $MeSiO_{3/2}$. This material is substantially hydrophobic and readily renders masonry hydrophobic. However, there are advantages in using an alkylmethyl/methylhydrogen copolymeric material in lieu of the methylhydrogen siloxane. Thus, the olefins used to prepare alkylmethylsiloxane/methylhydrogen copolymers are less expensive than methylhydrogen siloxane from which these copolymeric materials are prepared. Hence material expense for alkylmethyl/methylhydrogen copolymeric compounds is less than methylhydrogen siloxane because the former is essentially the latter diluted with olefin. Even though the copolymeric materials require more processing than methylhydrogen siloxane, expense of the alkylmethylsiloxane/methylhydrogen copolymer are still lower than methylhydrogen siloxane. The copolymer also is less volatile and has a higher flash point than polymethylhydrogen siloxane.

The following examples illustrate details in the process for preparing low volatile organic content emulsion compositions of the instant invention.

The preferred starting material is a methylhydrogencyclosiloxane such as $(OSiMeH)_4$. However, mixture of these cyclic siloxanes are as effective as the pure cyclic compound. The preferred olefin is 1-hexene. Other olefins include 1-pentene, 1-heptene, 1-octene, 1-decene or 1-dodecene. Mixtures of these olefins can also be used. The ratio of SiH to olefin can be varied, but this ratio should be such that a minimum of three SiH groups per molecule is retained. For example, if pure $(OSiMeH)_4$ is used, no more then one mole of olefin should be used per mole of cyclosiloxane. The method of hydrosilylation uses a heterogenous catalyst such as 0.5% Pt/C. A mixture of the SiH compound, olefin and catalyst is heated to reflux for approximately thirty minutes. If the batch size is large, it is advisable to reflux a small portion of the mixture while adding the remainder in small increments to control the highly exothermic reaction. The product from this reaction, a low viscosity oil, is a mixture of compounds having an average stoichiometry of $(OSiMeH)_{0.75}/(OSiMeR)_{0.25}$ wherein R=Me, $C_6H_{13}$, or $C_{12}H_{23}$.

The low viscosity oil is homogenized with water and a surfactant to produce an oil in water nonionic emulsion having a solids content of about thirty percent by weight. As long as the pH of the emulsion is near neutral, hydrolysis of SiH is insignificant. When compositions of this invention are applied to a substrate, water evaporates to leave a low viscosity oil. When the substrate is alkaline, this alkalinity will catalyze reactions of hydrolysis/condensation. Specifically, SiH reacts with moisture and hydroxyls present in the substrate to produce $SiOH + H_2$. SiOH condenses to produce siloxane $+ H_2O$. Since the silicone oil is multifunctional, a resinous structure will be formed with complete hydrolysis/condensation. This resin being highly hydrophobic waterproofs the substrate.

EXAMPLE IV

A solution of 300 grams of $(OSiMeH)_4$ and 105 grams of 1-hexene $(C_{12}H_{24})$ was prepared by weighing the two compounds into a one liter bottle and stirring the contents for one minute. 100 grams of this solution was placed into a one liter round bottom flask equipped with a reflux condenser and a heating mantle. Two pieces of eight mesh 0.5% Platinum on carbon (0.2 mg Pt each) were added to the flask and the mixture was heated to boiling. The remainder of the solution was poured into a 500 ml dropping funnel which was placed near the upper opening of the reflux condenser. When the mixture in the flask started to boil, solution from the dropping funnel was added slowly through the reflux condenser. The fresh solution was added to the mixture at such a rate so as to maintain a gentle reflux in the flask. Addition of the solution in the dropping funnel required about thirty minutes. After all of the solution had been added, the mixture in the flask was heated at reflux for an additional twenty minutes. The mixture was allowed to cool to room temperature and filtered through diatomaceous earth. FTIR analysis revealed the presence of SiH and the absence of olefin.

To 300 grams of this product was added six grams of the nonionic surfactant TERGITOL ® TMN-6 and 694 grams of distilled water. The mixture was stirred for thirty minutes and homogenized using a Gaulin laboratory homogenizer to produce an oil in water emulsion having a solids content of about 30 percent by weight. With the same procedure, $(OSiMeH)_4$ was partially reacted with 1-dodecene using one mole of olefin to one mole of $(OSiMeH)_4$ and the product was homogenized to obtain a 30% solids emulsion. $(OSiMeH)_4$ was also emulsified using the above procedure to produce a 30% solids emulsion. Two-hundred gram portions of the three emulsions were diluted with water to produce emulsions having a solids content of 15% by weight.

While a nonionic surfactant is shown in Example IV, other types of surfactants can be employed in accordance with the present invention. Thus, the emulsions of the present invention can be formulated with nonionic, cationic, or amphoteric surfactants and mixtures thereof. The emulsions may also contain freeze-thaw additives such as polyglycols, representative of which are ethylene glycol, propylene glycol, butylene glycol, mixtures, and copolymers thereof. Other techniques for preparing emulsions are applicable, for example as shown in U.S. Pat. No. 4,620,878, issued Nov. 4, 1986. The '878 patent also contains details of other suitable surfactants that may be employed. Reference is also made to the emulsion techniques and surfactants contained in U.S. Pat. No. 4,501,619, issued Feb. 26, 1985; U.S. Pat. No. 4,631,273, issued Dec. 23, 1986; and U.S. Pat. No. 4,842,766, issued Jun. 27, 1989. These four patents are considered incorporated herein by reference. It is noted that the nonionic surfactant of Example IV in an ethoxylated trimethylnonanol with an HLB value of 11.7, and is a trademark and product of Union Carbide Corporation, Industrial Chemicals Division, Danbury, Conn.

Conventional silane coupling agents are well known in the art for bonding resins to fillers and substrates. Typically as part of the process of producing composite materials, reinforcing fillers are treated with silane coupling agents before being introduced into the uncured resin. The silane coupling agents form a coating on the filler and the coating interacts with the resin either chemically or through the formation of interpenetrating polymer networks to form a strong cohesive bond between the resin and filler. A significant benefit of silane coupling agents is the added hydrolytic stability they provide composite materials.

Various conventional highly water soluble silane coupling agents can be used in the present invention. Generally silane coupling agents are of the formula $$A_{(4-n)}SiY_n$$

where A is a monovalent organic radical, Y is a hydrolyzable radical, and n is 1, 2, or 3, most preferably 3. A can be various types of organic radicals including alkyl or aryl radicals. Y radicals hydrolyze in the presence of water and include acetoxy radicals, alkoxy radicals with 1 to 6 carbon atoms, and alkylalkoxy radicals with 2 to 8 carbon atoms.

Specific silane coupling agents within the scope of the present invention include N-(2-aminoethyl)-3-aminopropyltrimethoxysilane, N-(aminoethylaminomethyl)-phenyltrimethoxysilane, N-(2-aminoethyl)-3-aminopropyltris(2-ethylhexoxy)-silane, 3-aminopropyltrimethoxysilane, trimethoxysilyl-propyldiethylenetriamine, bis(2-hydroxyethyl)-3-aminopropyltrimethoxysilane, 2-methacryloxyethyldimethyl-[3-trimethoxysilylpropyl] ammonium chloride, methyltrimethoxysilane, ethyltrimethoxysilane, propyltrimethoxysilane, and isobutyltrimethoxysilane.

In particular, the most preferred silane coupling agents include N-(2-aminoethyl)-3-aminopropyltrimethoxysilane, 3-aminopropyltrimethoxysilane, and the quaternary ammonium functional silanes. These silane coupling agents are commercially available. The other silane coupling agents are available commercially or their preparation is known in the art.

The silane coupling agents employed in accordance with the present invention should be highly water soluble silane coupling agents or hydrolyzed aqueous solutions thereof and exemplary of other of such materials are:

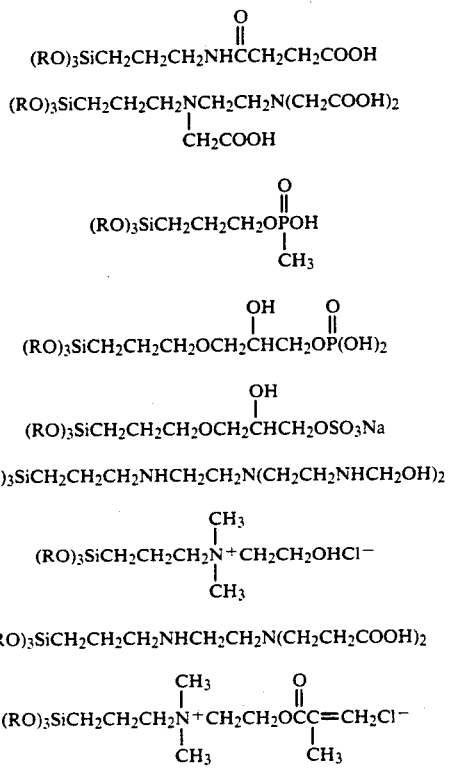

The most preferred water soluble silane coupling agent is N-(2-aminoethyl)-3-aminopropyltrimethoxysilane of the formula $(CH_3O)_3\text{-}SiCH_2CH_2CH_2NHCH_2CH_2NH_2$. This aminoalkyl functional silane is a low viscosity liquid having a viscosity of about six centistokes measured at twenty-five degrees Centigrade, and is a reactive fluid containing an alkylamine organic group and a trimethoxysilyl inorganic group.

In accordance with the present invention, a method is provided for rendering masonry architectural building materials water repellent. The method involves incorporating into the masonry architectural building material an additive which is a mixture of (i) a water soluble silane coupling agent and (ii) an emulsion which includes water, at least one surfactant, and a siloxane fluid. The siloxane fluid may be one of a material such as a linear methylhydrogen siloxane polymer, a linear methylhydrogen-methylalkyl siloxane copolymer, a methylhydrogen cyclosiloxane polymer, or a methylhydrogen-methylalkyl cyclosiloxane copolymer. Both the water soluble silane coupling agent and the emulsion have been described in detail above.

While the method of the present invention is applicable in general to masonry materials, the preferred masonry architectural building material includes gypsum, and most preferably is in the form of gypsum wallboard. Gypsum is calcium sulfate dihydrate $CaSO_4 \cdot 2H_2O$. When calcium sulfate dihydrate is heated to temperatures above about one hundred and ten degrees Centigrade, moisture is evolved. The resulting product is plaster of paris often termed stucco. Plaster of paris has an approximate composition of CaSO4 1/2H2O where the final temperature does not exceed about two hundred and five degrees Centigrade. When plaster of paris is mixed with water it rehydrates and sets to a solid mass within a few minutes. Wallboard can be produced by layering slabs of the solid mass between sheets of fabric or tough paper.

The mixture which is employed in accordance with the present invention includes from about forty to eighty percent by weight of the emulsion and from about twenty to sixty percent by weight of the water soluble silane coupling agent. The most preferred mixture includes about seventy percent by weight of the emulsion and about thirty percent by weight of the water soluble silane coupling agent. The mixture is incorporated into the masonry architectural building material in an amount of from about 0.1 percent by weight to about 0.8 percent by weight, and may be incorporated into the masonry architectural building material by adding the mixture to a slurry of the gypsum prior to fabrication of the wallboard.

The following example is provided by way of additional illustration to further exemplify the concepts of the present invention.

EXAMPLE V

A method for measuring the performance of moisture resistant gypsum wallboard was established and involved mixing a slurry, casting a standard sample, total immersion of the sample in water for a specified period, and measurement of moisture uptake. Apparatus which was used included silicone rubber molds for casting two inch cube gypsum samples, a blender for mixing the slurry, an oven, and a constant temperature water bath which included supports for the cubes. In each instance, five hundred grams of stucco and four hundred grams of water was used to form the slurry along with varying amounts of the organosilicon mixture. The organosilicon mixture was employed in amounts of 1.5, 3.0, and 6.0 grams, corresponding respectively to weight percentages of 0.16, 0.33, and 0.66%. Water was placed in the blender and the organosilicon mixture was added to the blender and mixed briefly. The stucco was added to the blender and allowed to soak for about ten minutes. The contents of the blender were mixed on high speed for fifteen seconds and poured into the molds. The molds were tapped to remove any entrapped air and leveled with a spatula. Following setting, the cubes were removed from the molds and dried at forty degrees Centigrade overnight. The dried cubes were weighed and submerged in the bath at twenty-two degrees Centigrade. The cubes were allowed to soak in the bath for about two hours and were removed, padded dry and weight. The amount of water absorbed was calculated. The average moisture absorption of a cube which did not contain the organosilicon mixture of the present invention was found to be forty-eight percent. The weight gain in percent due to moisture absorption is indicated in the accompanying tables along with the percent by weight of the components of the organosilicon mixture. Unless otherwise indicated, the amount of the mixture which was employed is three grams.

TABLE I

| Silane Coupling Agent (Percent by weight) | Moisture Pickup (Percent by weight) | (Percent) |
| --- | --- | --- |
| 75 | 25 | 6.1 |
| 50 | 50 | 4.6 |
| 100 | — | 31.7 |
| — | — | 48.0 |

Table I indicates that cubes containing the mixture of the emulsion and the silane coupling agent were far more effective at repelling moisture than cubes containing only the emulsion, and significantly better than cubes which did not contain the organosilicon mixture.

TABLE II

| Emulsion (Percent by weight) | Silane Coupling Agent (Percent by weight) | Moisture Pickup (Percent) |
| --- | --- | --- |
| 100 | — | 15.5 |
| 95 | 5 | 9.5 |
| 90 | 10 | 10.0 |
| 80 | 20 | 4.1 |
| 70 | 30 | 2.7 |
| 60 | 40 | 4.0 |
| 50 | 50 | 0.9 |
| 40 | 60 | 0.9 |
| 30 | 70 | 21.2 |
| 20 | 80 | 48.8 |
| 10 | 90 | 47.1 |
| — | — | 48.0 |

It can be seen from Table II that the most effective range can be found when the mixture contains from about forty to eighty percent by weight of the emulsion and from about twenty to sixty percent by weight of the water soluble silane coupling agent. The optimum blend has been found to be a mixture including about seventy percent by weight of the emulsion and about thirty percent by weight of the water soluble silane coupling agent. Data for Table II was obtained in accordance with the procedure of Example V. Table III shows the results of more detailed tests conducted in accordance with Example V and wherein organosilicon mixtures of varying proportions were employed.

TABLE III

| Emulsion (A) (% by wt) | Coupling Agent (B) (% by wt) | Moisture (%) | Grams A + B |
| --- | --- | --- | --- |
| 90 | 10 | 29.4 | 1.5 |
| 90 | 10 | 5.0 | 3.0 |
| 90 | 10 | 0.9 | 6.0 |
| 80 | 20 | 28.6 | 1.5 |
| 80 | 20 | 3.3 | 3.0 |
| 80 | 20 | 0.6 | 6.0 |
| 70 | 30 | 27.3 | 1.5 |
| 70 | 30 | 2.3 | 3.0 |
| 70 | 30 | 0.9 | 6.0 |
| 60 | 40 | 17.0 | 1.5 |
| 60 | 40 | 2.0 | 3.0 |
| 60 | 40 | 0.7 | 6.0 |
| 50 | 50 | 39.8 | 1.5 |
| 50 | 50 | 3.3 | 3.0 |
| 50 | 50 | 0.4 | 6.0 |
| 40 | 60 | 42.9 | 1.5 |
| 40 | 60 | 10.9 | 3.0 |
| 40 | 60 | 0.3 | 6.0 |
| — | — | 48.0 | — |

It will be apparent from the foregoing that many other variations and modifications may be made in the compounds, compositions, structures, and methods described herein without departing substantially from the essential features and concepts of the present invention.

Accordingly, it should be clearly understood that the forms of the invention described herein are exemplary only and are not intended as limitations on the scope of the present invention as defined in the appended claims.

That which is claimed is:

1. A method of rendering masonry architectural building materials water repellent comprising incorporating into the masonry architectural building material an additive which is a mixture of (i) a water soluble silane coupling agent and (ii) an emulsion which includes water, at least one surfactant, and a siloxane fluid, the siloxane fluid being selected from the group consisting of linear methylhydrogen siloxane polymers, linear methylhydrogen-methylalkyl siloxane copolymers, methylhydrogen cyclosiloxane polymers, and methylhydrogen-methylalkyl cyclosiloxane copolymers.

2. The method of claim 1 wherein the masonry architectural building material includes gypsum.

3. The method of claim 2 wherein the masonry architectural building material is a gypsum wallboard.

4. The method of claim 1 wherein the mixture includes from about forty to eighty percent by weight of the emulsion and from about twenty to sixty percent by weight of the water soluble silane coupling agent.

5. The method of claim 4 wherein the mixture includes about seventy percent by weight of the emulsion and about thirty percent by weight of the water soluble silane coupling agent.

6. The method of claim 1 wherein the mixture is incorporated into the masonry architectural building material in an amount of from about 0.1 percent by weight to about 0.8 percent by weight.

7. The method of claim 3 wherein the mixture is incorporated into the masonry architectural building material by adding the mixture to a slurry of the gypsum prior to fabrication of the wallboard.

8. The method of claim 1 wherein the silane coupling agent is an aminofunctional silane coupling agent selected from the group consisting of N-(2-aminoethyl)-3-aminopropyltrimethoxysilane, 3-amionpropyltrimethoxysilane, trimethoxysilylpropyldiethylenetriamine, aminopropyltriethoxysilane, and bis(2-hydroxyethyl)-3-aminopropyltrimethoxysilane.

9. The method of claim 8 where in the silane coupling agent is N-(2-aminoethyl)-3-aminopropyltrimethoxysilane.

10. The method of claim 1 wherein the silane coupling agent is a quaternary ammonium functional silane coupling agent selected from the group consisting of 2-methacryloxyethyldimethyl [3-trimethoxysilylpropyl] ammonium chloride and 2-hydroxyethyldimethyl[3-trimethoxysilylpropyl] ammonium chloride.

11. The method of claim 1 in which the siloxane fluid has the formula selected from the group consisting of

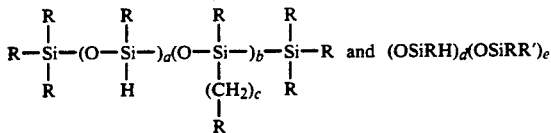

wherein R is an alkyl radical having from one to three carbon atoms; R' is the alkyl radical $(CH_2)_cR$; a is an integer having a value of from 3 to 35; b is an integer having a value of from zero to 32; c is an integer having a value of from one to seventeen; d is an integer having a value of from 3 to 10; and e is an integer having a value of from zero to seven.

12. The method of claim 11 in which the surfactant is selected from the group consisting of nonionic, cationic, amphoteric, and mixtures thereof.

13. The method of claim 12 wherein the surfactant is nonionic.

14. The method of claim 1 wherein the emulsion includes from about twenty to about sixty percent by weight of the siloxane fluid.

15. The method of claim 14 wherein the emulsion includes forty to fifty percent by weight of the siloxane fluid.

16. A water repellent masonry architectural building material comprising an inorganic porous mineral substrate for forming the masonry architectural building material, and an additive incorporated into the inorganic porous mineral substrate for rendering the masonry architectural building material water repellent, the additive being a mixture of (i) a water soluble silane coupling agent and (ii) an emulsion which includes water, at least one surfactant, and a siloxane fluid, the siloxane fluid being selected from the group consisting of linear methylhydrogen siloxane polymers, linear methylhydrogen-methylalkyl siloxane copolymers, methylhydrogen cyclosiloxane polymers, and methylhydrogen-methylalkyl cyclosiloxane copolymers.

17. The material of claim 16 wherein the inorganic porous mineral substrate for forming the masonry architectural building material includes gypsum.

18. The material of claim 17 wherein the masonry architectural building material is a gypsum wallboard.

19. The material of claim 16 wherein the mixture includes from about forty to eighty percent by weight of the emulsion and from about twenty to sixty percent by weight of the water soluble silane coupling agent.

20. The material of claim 19 wherein the mixture includes about seventy percent by weight of the emulsion and about thirty percent by weight of the water soluble silane coupling agent.

21. The material of claim 16 wherein the mixture is incorporated into the inorganic porous mineral substrate in an amount of from about 0.1 percent by weight to about 0.8 percent by weight.

22. The material of claim 18 wherein the mixture is incorporated into the inorganic porous mineral substrate by adding the mixture to a slurry of the gypsum prior to fabrication of the wallboard.

23. The material of claim 16 wherein the silane coupling agent is an aminofunctional silane coupling agent selected from the group consisting of N-(2-aminoethyl)-3-aminopropyltrimethoxysilane, 3-aminopropyltrimethoxysilane, trimethoxysilylpropyldiethylenetriamine, aminopropyltriethoxysilane, and bis(2-hydroxyethyl)-3-aminopropyltrimethoxysilane.

24. The material of claim 23 where in the silane coupling agent is N-(2-aminoethyl)-3-aminopropyltrimethoxysilane.

25. The material of claim 16 wherein the silane coupling agent is a quaternary ammonium functional silane coupling agent selected from the group consisting of 2-methacryloxyethyldimethyl [3-trimethoxysilylpropyl] ammonium chloride and 2-hydroxyethyldimethyl[3-trimethoxysilylpropyl] ammonium chloride.

26. The material of claim 16 in which the siloxane fluid has the formula selected from the group consisting of

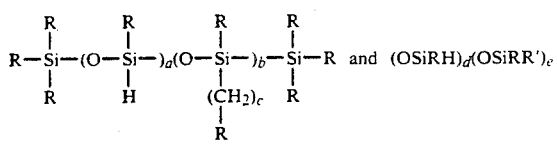

wherein R is an alkyl radical having from one to three carbon atoms; R' is the alkyl radical $(CH_2)_cR$; a is an integer having a value of from 3 to 35; b is an integer having a value of from zero to 32; c is an integer having a value of from one to seventeen; d is an integer having a value of from 3 to 10; and e is an integer having a value of from zero to seven.

27. The material of claim 26 in which the surfactant is selected from the group consisting of nonionic, cationic, amphoteric, and mixtures thereof.

28. The material of claim 27 wherein the surfactant is nonionic.

29. The material of claim 16 wherein the emulsion includes from about twenty to about sixty percent by weight of the siloxane fluid.

30. The material of claim 29 wherein the emulsion includes forty to fifty percent by weight of the siloxane fluid.

31. A composition for rendering masonry architectural building materials water repellent comprising a mixture of (i) a water soluble silane coupling agent and (ii) an emulsion which includes water, at least one surfactant, and a siloxane fluid, the siloxane fluid being selected from the group consisting of linear methylhydrogen siloxane polymers, linear methylhydrogen-methylalkyl siloxane copolymers, methylhydrogen cyclosiloxane polymers, and methylhydrogen-methylalkyl cyclosiloxane copolymers.

32. The composition of claim 31 wherein the mixture includes from about forty to eighty percent by weight of the emulsion and from about twenty to sixty percent by weight of the water soluble silane coupling agent.

33. The composition of claim 32 wherein the mixture includes about seventy percent by weight of the emulsion and about thirty percent by weight of the water soluble silane coupling agent.

34. The composition of claim 31 wherein the silane coupling agent is an aminofunctional silane coupling agent selected from the group consisting of N-(2-aminoethyl)-3-aminopropyltrimethoxysilane, 3-amionpropyltrimethoxysilane, trimethoxysilylpropyldiethylenetriamine, aminopropyltriethoxysilane, and bis(2-hydroxyethyl)-3-aminopropyltrimethoxysilane.

35. The composition of claim 34 where in the silane coupling agent is N-(2-aminoethyl)-3-aminopropyltrimethoxy-silane.

36. The composition of claim 34 wherein the silane coupling agent is a quaternary ammonium functional silane coupling agent selected from the group consisting of 2-methacryloxyethyldimethyl [3-trimethoxysilylpropyl] ammonium chloride and 2-hydroxyethyldimethyl[3-trimethoxysilylpropyl] ammonium chloride.

37. The composition of claim 31 in which the siloxane fluid has the formula selected from the group consisting of

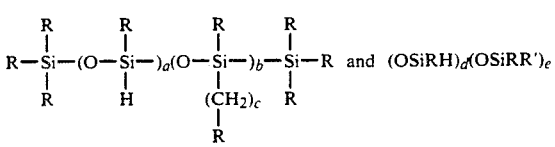

wherein R is an alkyl radical having from one to three carbon atoms; R' is the alkyl radical $(CH_2)_cR$; a is an integer having a value of from 3 to 35; b is an integer having a value of from zero to 32; c is an integer having a value of from one to seventeen; d is an integer having a value of from 3 to 10; and e is an integer having a value of from zero to seven.

38. The composition of claim 37 in which the surfactant is selected from the group consisting of nonionic, cationic, amphoteric, and mixtures thereof.

39. The composition of claim 38 wherein the surfactant is nonionic.

40. The composition of claim 34 wherein the emulsion includes from about twenty to about sixty percent by weight of the siloxane fluid.

41. The composition of claim 40 wherein the emulsion includes forty to fifty percent by weight of the siloxane fluid.

* * * * *